(No Model.)
J. F. GREINER.
PLOW FENDER.
No. 513,918. Patented Jan. 30, 1894.
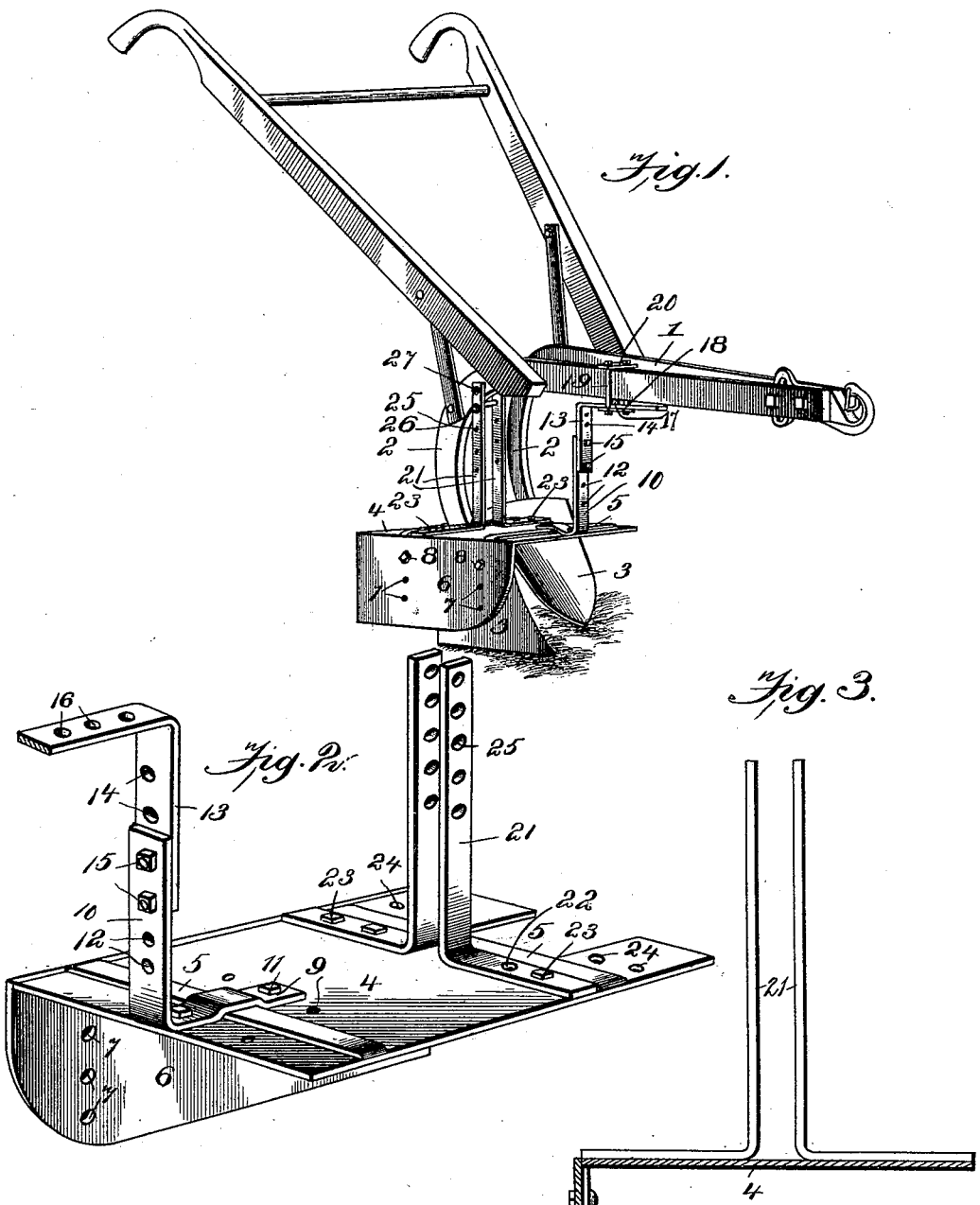
Witnesses:
John C. Shaw
W. S. Duvall
Inventor:
John F. Greiner.
By his Attorneys,
C. A. Snow & Co.

UNITED STATES PATENT OFFICE.

JOHN F. GREINER, OF McKENZIE, TENNESSEE, ASSIGNOR OF ONE-HALF TO T. B. ADAMS, OF SAME PLACE.

PLOW-FENDER.

SPECIFICATION forming part of Letters Patent No. 513,918, dated January 30, 1894.

Application filed May 29, 1893. Serial No. 475,947. (No model.)

*To all whom it may concern:*

Be it known that I, JOHN F. GREINER, a citizen of the United States, residing at McKenzie, in the county of Carroll and State of Tennessee, have invented a new and useful Plow-Fender, of which the following is a specification.

My invention relates to improvements in plow-fenders the objects in view being to provide a fender adapted to be applied to any ordinary double shovel plow at one side thereof or to be duplicated at opposite sides of a straddle-row cultivator, said fender or fenders serving their usual functions of limiting the amount of dirt thrown toward the corn or cotton that is being cultivated.

With these objects in view the invention consists in certain features of construction hereinafter specified and particularly pointed out in the claims.

Referring to the drawings, Figure 1 is a perspective view of a double-shovel plow provided with a fender embodying my invention. Fig. 2 is an enlarged detail in perspective of the fender. Fig. 3 is a transverse sectional view.

Like numerals of reference indicate like parts in all the figures of the drawings.

The diverging beams 1, as usual, terminate at their rear ends in the goose-necked or curved standards 2, which standards have secured at their lower ends the shovels 3, one of which is arranged in advance of the other, as is usual in double-shovel plows or cultivators.

Supported upon the advance shovel, which in the present instance is at the right hand side of the plow, is a horizontal sheet metal fender or plate 4, the same being notched at its rear end so as to receive the standard 2. The horizontal fender 4 is surmounted near its front and rear ends by transverse metal straps 5, whose outer ends depend at the free edge of the horizontal fender and are perforated. The fender 4 is somewhat wider than the shovel, so that its outer end extends beyond that of the shovel a short distance.

Applied to the depending ends of the straps 5 is the vertical fender 6, the same having near its front and rear ends or coincident with the bent ends of the straps 5, adjusting holes 7, through which bolts 8 are passed and by means of which the vertical fender may be raised and lowered to and from the ground and adjusted with relation to the horizontal fender 4.

Near the inner front corner of the horizontal fender 4 a series of transversely disposed adjusting holes 9 are formed, and surmounting the fender at this point is an L-shaped metal standard 10, the lower horizontal portion having perforations adapted to align with the holes 9 in the fender and to be secured in any pair of the same by bolts 11 passed therethrough. The vertical branch of the standard 10 has a series of perforations 12.

Forming an extension of the standard 10 is an inverted L-shaped standard 13, the same having its vertical branch provided with perforations 14 adapted to align with the perforations 12 of the standard 10 and the two standards are adjustably connected through the medium of adjusting bolts 15 passed through the perforations 12 and 14.

The upper or horizontal portion of the L-shaped standard 13 is provided with a series of perforations 16 and in one of these through the medium of a bolt 17 there is secured a clip-plate 18, which passes under the said standard, the latter being arranged under the beam 1.

The clip-plate is provided with perforations, and in these are located bolts 19, which are designed to embrace the beams and to pass upwardly through perforations formed in a superimposed clip-plate 20. In this manner it will be seen that the standards 10 and 13 may be adjusted as a whole laterally through the medium of the bolts 11 and holes 9, or may be expanded or contracted through the medium of the bolts 15, or may be connected at any point along the beam 1 through the medium of the bolt 17.

In rear of the standard 10 the horizontal fender 4 is surmounted by a pair of reversely disposed L-shaped standards 21, which have their lower portions or branches perforated as at 22 for the reception of bolts 23, which bolts pass down through the holes in either a front or rear series 24 that are formed in the said fender, whereby the standards may be set to the front or rear to accommodate the style of plow. The vertical portions of the standards 21 have aligning perforations 25, through which a supporting bolt 26 passes and is adapted to take under the standard of the plow acting as a brace bolt. An upper bolt 27 passes through any one of the perforations and binding upon the standard of the plow serves as a binding-bolt.

It will be seen that through the various adjustments described, the attachment may be applied to any ordinary plow, or by a duplication of the attachment the same is adapted for application to a straddle-row cultivator; and, furthermore, that by an adjustment of the vertical fender the amount of dirt thrown toward the plants may be regulated at will.

Having described my invention, what I claim is—

1. The herein described fender for plows, the same consisting of a horizontal fender adapted to fit over the upper end of a shovel, straps surmounting and transversely traversing the fender and having their outer ends downwardly bent and perforated, a vertical fender having corresponding perforations, and adjusting bolts passed through the vertical fender and the perforations in the bent ends of the straps, and means for securing the attachment to the plow, substantially as specified.

2. The herein described fender for plows, the same consisting of a horizontal fender adapted to fit over the upper end of a shovel, straps surmounting and transversely traversing the fender and having their outer ends downwardly bent and perforated, a vertical fender having corresponding perforations, and adjusting bolts passed through the vertical fender and the perforations in the bent ends of the straps, and adjusting devices between the fender and plow, substantially as specified.

3. The combination with the plow-beam and standard, of the fender comprising a horizontal and an outer vertical portion, the pair of reversely disposed L-shaped standards 10 and 13 adjustably connected to each other and to the plow and fender, and the rear pair of L-shaped standards having perforations aligning with each other and adapted to embrace the plow standard, and the bolts for securing the same to the plow standard, substantially as specified.

4. The combination with the plow beam, the shovel, and standard, of the fender comprising a horizontal and outer vertical portion, the horizontal portion being provided at its front inner corner with a series of transversely disposed openings and near the rear edge with front and rear series of openings and notched to receive the standard of the plow, the opposite L-shaped standards 21 having their lower and upper portions provided with adjusting holes, bolts 22 for connecting the lower portions with the rear series of openings of the fenders, the brace bolt 26 and binding-bolt 27 arranged in the upper series of openings, the opposite L-shaped standards perforated and overlapping each other and adjustably connected to the front end of the fender and the beam, the bolts 11 for connecting the lower end of said standard to the perforations in the fender at the front inner corner thereof, the clip-plate 18, the bolt 17 passing therethrough into the upper end of the standard, the bolts 19, and the clip-plate 20 for embracing the beam, substantially as specified.

In testimony that I claim the foregoing as my own I have hereto affixed my signature in the presence of two witnesses.

JOHN F. GREINER.

Witnesses:
R. D. GWIN,
W. D. HUNTER.